United States Patent
Karaogoz

(10) Patent No.: US 8,812,656 B2
(45) Date of Patent: Aug. 19, 2014

(54) SYSTEM AND METHOD FOR AUTOMATICALLY MANAGING A NETWORK OF USER-SELECTABLE DEVICES

(75) Inventor: Jeyhan Karaogoz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 32 days.

(21) Appl. No.: 13/042,165

(22) Filed: Mar. 7, 2011

(65) Prior Publication Data

US 2011/0252131 A1 Oct. 13, 2011

Related U.S. Application Data

(60) Provisional application No. 61/323,223, filed on Apr. 12, 2010.

(51) Int. Cl.
*G06F 15/173* (2006.01)

(52) U.S. Cl.
USPC ........... 709/224; 370/331; 370/352; 370/401; 379/93.01; 379/93.17; 382/103; 348/143

(58) Field of Classification Search
USPC ........ 709/224; 370/331, 352, 401; 379/93.02, 379/93.17; 382/103; 348/143
See application file for complete search history.

(56) References Cited

U.S. PATENT DOCUMENTS

| | | | |
|---|---|---|---|
| 6,463,343 B1 | 10/2002 | Emens et al. | |
| 7,085,814 B1 | 8/2006 | Gandhi et al. | |
| 7,188,139 B1 | 3/2007 | Ayatsuka et al. | |
| 7,778,664 B1 | 8/2010 | Fujisaki | |
| 7,856,093 B2 | 12/2010 | Fujimori et al. | |
| 7,987,489 B2 | 7/2011 | Krzyzanowski et al. | |
| 8,196,064 B2 | 6/2012 | Krzyzanowski et al. | |
| 8,218,547 B2 * | 7/2012 | Van Steen et al. | 370/392 |
| 2005/0010866 A1 | 1/2005 | Humpleman et al. | |
| 2005/0226463 A1 * | 10/2005 | Suzuki et al. | 382/103 |
| 2005/0249486 A1 | 11/2005 | Murray | |
| 2007/0070186 A1 | 3/2007 | Fujimori et al. | |
| 2007/0214368 A1 | 9/2007 | Ota et al. | |
| 2008/0019317 A1 * | 1/2008 | Vellanki et al. | 370/331 |
| 2008/0136972 A1 | 6/2008 | Blankenburg | |
| 2009/0281676 A1 | 11/2009 | Beavis et al. | |
| 2010/0091961 A1 * | 4/2010 | Jones et al. | 379/93.02 |
| 2010/0137020 A1 | 6/2010 | Rofougaran | |
| 2010/0149355 A1 | 6/2010 | Koshiba et al. | |
| 2010/0165217 A1 | 7/2010 | Jacob | |

(Continued)

FOREIGN PATENT DOCUMENTS

| | | |
|---|---|---|
| EP | 1345381 | 9/2003 |
| WO | WO 2006/136985 | 12/2006 |
| WO | WO 2009/149084 | 12/2009 |

OTHER PUBLICATIONS

EPO Communication dated Jun. 15, 2011 in Application No. 11 00 2892.5-1244, 6 pages.

*Primary Examiner* — Kyung H Shin

(74) *Attorney, Agent, or Firm* — Brinks Gilson & Lione

(57) ABSTRACT

A system and method for automatically forming and/or maintaining a network of user-selectable devices, substantially as shown in and/or described in connection with at least one of the figures, as set forth more completely in the claims, substantially as shown in and/or described in connection with at least one of the figures, as set forth more completely in the claims.

29 Claims, 8 Drawing Sheets

(56) References Cited

U.S. PATENT DOCUMENTS

| | | |
|---|---|---|
| 2011/0007901 A1 | 1/2011 | Ikeda et al. |
| 2011/0016234 A1 | 1/2011 | Stecyk et al. |
| 2011/0074679 A1 | 3/2011 | West et al. |
| 2011/0085082 A1 | 4/2011 | Jing et al. |
| 2011/0261206 A1 | 10/2011 | Thomas et al. |

* cited by examiner

US 8,812,656 B2

SYSTEM AND METHOD FOR AUTOMATICALLY MANAGING A NETWORK OF USER-SELECTABLE DEVICES

CROSS-REFERENCE TO RELATED APPLICATIONS/INCORPORATION BY REFERENCE

This patent application is related to and claims priority from provisional patent application Ser. No. 61/323,223 filed Apr. 12, 2010, and titled "SYSTEMS AND METHODS FOR PROVIDING IMAGE-BASED REMOTE CONTROL," the contents of which are hereby incorporated herein by reference in their entirety. This patent application is also related to U.S. patent application Ser. No. 13/042,133, filed concurrently herewith, titled "SYSTEM AND METHOD FOR MANAGING A NETWORK OF USER-SELECTABLE DEVICES"; U.S. patent application Ser. No. 13/042,198, filed concurrently herewith, titled "SYSTEM AND METHOD PROVIDING REMOTE USER SELECTION OF A DEVICE"; and U.S. patent application Ser. No. 13/042,223, filed concurrently herewith, titled "SYSTEM AND METHOD IN A NETWORK CONTROLLER FOR REMOTELY MONITORING AND/OR CONTROLLING DEVICES". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present communication networks are incapable of providing for and/or conveniently providing for user-selection of communication network devices (e.g., for remote monitoring and/or control). Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for automatically forming and/or maintaining a network of user-selectable devices, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
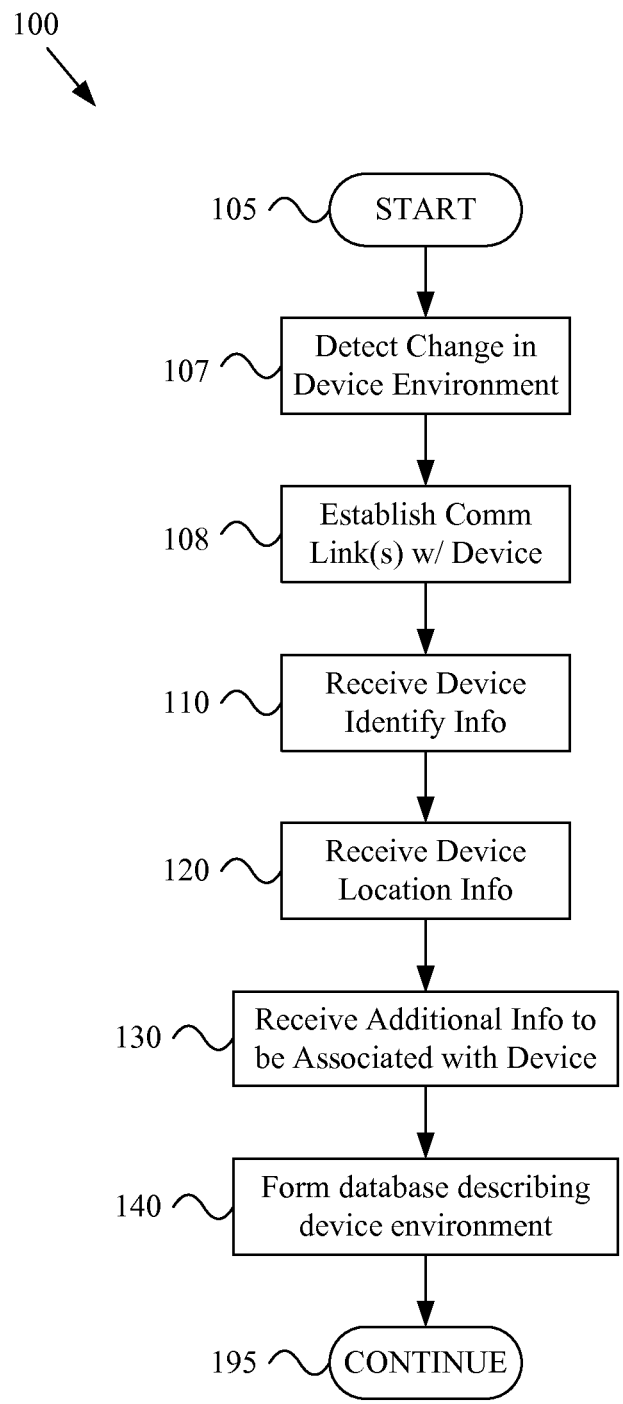
FIG. 1 shows a flow diagram of a non-limiting exemplary method for automatically maintaining a network of user-selectable devices and/or a database characterization thereof, in accordance with various aspects of the present invention.

The following discussion will refer to various modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various system modules (e.g., communication modules, processor modules, memory or database modules, user interface modules, etc.). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, a personal computer, a network controller, a user-selectable device with network communication capability, a consumer electronic device with network communication capability, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network, etc. A particular communication network may, for example, generally have a corresponding communication protocol according to which a communication device may communicate with other devices in and/or via the communication network. Unless so claimed, the scope of various aspects of the present invention should not be limited by characteristics of a particular type of communication network.

In a non-limiting exemplary scenario that comprises various aspects of the present invention, a camera may capture an image (e.g., a real-time image) of an environment (e.g., a home environment, office environment, etc.) comprising devices that may be monitored and/or controlled by a user. Such image may, for example, be a real-time image, a periodically updated image, an image acquired during system configuration, etc.). A graphical map may also (and/or alternatively), for example, be similarly utilized. The system may then present the image to the user (e.g., on a display device, a touch input device, etc.). The user may then identify a device in the image with which the user desires to interact (e.g., in a monitoring and/or controlling capacity). For example, the user may touch the device in the image on a touch screen, identify the device with a movable cursor, indicate the image with a light pen, etc. The system may then determine the user-identified device. Such determination may, for example, comprise analyzing a database of devices in a particular area. Such database may, for example, be maintained manually and/or automatically without user interaction.

The system may, for example, establish a communication link (directly or indirectly) with the user-identified device. The system may then determine user interface options to present to the user. Such user interface options may, for example, be related to monitoring and/or controlling the user-identified device. The system may present the determined user interface options to the user. The system may then interact with the user (e.g., presenting user interface options to the user and receiving user input corresponding to such user interface options). The system may then form signals recognized by the user-identified device, where such signals correspond to the user input. Such signals may, for example, comprise data structures, command identifiers, etc., corresponding to a communication protocol understood by the user-identified device. The system may then communicate the formed signal to the user-identified device (e.g., utilizing a communication protocol understood by the user-identified device over a communication network to which the user-identified device is communicatively coupled. The system may then, depending on the nature of the user input, continue to interact with the user-identified device, for example transmitting additional commands/information to the user-identified device and/or receiving information from the user-identified device.

Turning first to FIG. 1, such figure shows a flow diagram of a non-limiting exemplary method 100 for automatically maintaining a network of user-selectable devices and/or a database characterization thereof, in accordance with various aspects of the present invention. The method 100 may, for example, be implemented in a network controller device, gateway, router, access point, etc. Such network controller device may, for example, be implemented in a home device (e.g., a hub of a home computing network, a home-based desktop computer, a home gateway and/or router, etc.). The method 100 may also, for example, be implemented in a portable computing device. Such a portable computing device may, for example, be a laptop or notebook computer, handheld computing device, cellular phone, personal digital assistant, etc.

The method 100 may begin executing at step 105. The method 100 may begin executing in response to any of a variety of causes and/or conditions, non-limiting examples of which will now be provided. For example, the method 100 may begin executing in response to a user command to begin. Also for example, the method 100 may begin executing in response to detection of the presence of an unknown device within a particular geographic area (e.g., within a premises, office, room, suite of rooms, home, campus, etc.). Further for example, the method 100 may begin executing in response to a determination that a device being tracked has moved or has potentially moved. Additionally, for example, the method 100 may begin executing in response to failure to establish a communication link with a device in a particular area (e.g., when such device is predicted or previously known to be in such area). The exemplary method 100 may, for example, begin executing periodically (e.g., at a constant or substantially constant period, for example hourly, daily, etc.), surveying one or more particular areas. Also for example, the exemplary method 100 may begin executing in response to a user command to execute. Also for example, the method 100 may begin executing upon receiving a user input selecting a location on an image being presented to a user (e.g., a user touching an electronic device shown to the user on an image of a room).

The method 100 may, for example at step 107, comprise detecting a change in an environment (or network) of devices (e.g., corresponding to a set of devices located in one or more geographical areas of interest). Such operation may, for example, provide for tracking the location of all devices within a particular region with which a user may communicate (e.g., communicate with in a monitoring and/or controlling manner).

Step 107 may, for example, comprise monitoring a network of devices. For example, such a network of devices may correspond to a particular geographical area (e.g., a room, home, office, campus, other premises, etc.). Step 107 may comprise detecting devices in a particular area, detecting devices that have newly entered a particular area, detecting that devices previously detected in the particular area have left the particular area, etc. Step 107 may comprise performing such monitoring in any of a variety of manners (e.g., utilizing wireless RF technology, optical technology, imaging technology, user interface technology, etc.).

For example, step 107 may comprise monitoring an area for RF transmissions (e.g., beacons, beacon responses, noise, etc.). For example, step 107 may comprise detecting a new beacon signal from a device that has recently entered an area being monitored. Also for example, step 107 may comprise detecting a response to a beacon signal sent out by an access point or other networked device, where such device is relatively new to the monitored area and/or has moved within the monitored area. Further for example, step 107 may comprise listening to communications (e.g., RF wireless communications) between a device in the monitored area and another device (within or without the monitored area).

Also for example, step 107 may comprise utilizing imaging technology, for example, 2-D and/or 3-D imaging technology to monitor changes in the device make-up of the monitored area. For example, step 107 may utilize acoustical sensing based on sound reflection, RF sensing based on radio wave reflections, laser reflection, etc. to determine when a significant change in the monitored device environment may be changing. For example, step 107 may comprise detecting a change in an image of the monitored area due to the introduction of a new electronic device into the environment (and/or removal of an electronic device from the environment). For example, step 107 may comprise comparing a present image to a baseline image to determine whether a significant change in the monitored device environment might have occurred.

For example, step 107 may comprise utilizing optical technology (e.g., camera technology) to determine whether a change in the monitored area might have occurred. For example, step 107 may comprise comparing a present camera image to a baseline camera image (e.g., an image corresponding to the most recent device environment update) to determine whether a change in the monitored area might have occurred (e.g., the addition of a device, the removal of a device, the movement of a device, etc.). In a non-limiting exemplary scenario in which a set of pixels in a baseline image of an area are associated with a particular user-selectable electronic device, step 107 may comprise comparing a present camera image of the area to determine whether there has been a significant change in such pixels, where such a significant change is indicative of a potential change in the environment (e.g., the removal or movement of the particular device).

Step 107 may, for example, comprise monitoring one or more monitored areas on a regular periodic basis, on a random basis, in response to a user command, only when processing and/or communication bandwidth is plentiful (e.g., so-as to minimize the impact of such monitoring on general network operation), etc.

Further for example, though any or all of the above-mentioned monitoring techniques may be performed entirely automatically (i.e., without direct user interaction), step 107 may comprise interacting with a user to monitor an area. For example, a user may indicate that a change has been made to the monitored environment (e.g., the incorporation of a new device, removal of a device, replacement of a device, movement of a device, etc.). A user may, for example, provide a user input selecting a location on an image being presented to a user (e.g., a user touching or otherwise indicating an electronic device shown to the user on an image of a room, where such electronic device is associated with a change in the environment). As discussed previously, and as discussed in the provisional patent application No. 61/323,223, a user may input any of a variety of different types of information.

Still further for example, step 107 may comprise receiving and/or processing information from an external system that tracks position of various devices. For example, step 107 may comprise receiving information from a Global Positioning System (or the like) of devices within the monitored area. In such an exemplary scenario, step 107 may comprise comparing a list of present devices within the monitored area to a previously formed baseline list of present devices to determine whether the device makeup of the monitored environment has changed.

In general, step 107 may comprise detecting a change in an environment of devices (e.g., by monitoring a network of devices to determine whether a device environment corresponding to a monitored area has changed). Accordingly, the scope of various aspects of the present invention should not be limited by characteristics of any particular manner of performing such monitoring unless explicitly claimed.

The method 100 may, for example at step 108, comprise establishing one or more communication links with a device of interest. For example, such a device of interest may correspond to a device causing (or otherwise associated with) a change in a device environment (e.g., as detected at step 107). For example, such a device may, for example, have been detected as a potential new addition to a particular area, a device in a particular area that has potentially been moved within the particular area, a device that has potentially been removed from the particular area, etc. As mentioned above, such device might be a previously-known device or an unknown device (e.g., a device which may have been selected by a user on an image presented to the user).

Step 108 may comprise establishing the communication link(s) in any of a variety of manners. For example and without limitation, in a first exemplary scenario in which the presence of the device was detected via wireless signal analysis, step 108 may comprise establishing a wireless communication link with such device (e.g., responding to a beacon message from such device, transmitting a beacon message to such device, attempting to contact such device via an intervening communication network access point, etc.).

In another exemplary scenario, in which the device of interest was identified via non-communication signal means (e.g., by image comparison, image recognition, analyzing location information, user input, etc.), step 108 may comprise transmitting one or more beacon messages corresponding to one or more communication protocols (e.g., attempting a plurality of different communication protocols and/or communication networks until a desired communication link is established).

Step 108 may, for example in a scenario where the location of a device of interest is known, comprise communicating directional signals (e.g., via beam-forming) to and/or from the device and/or to a particular region containing the device. Such directional communication may, for example, reduce interference in the wireless medium, reduce communication with devices that are not presently of interest, etc.

In yet another exemplary scenario, step 108 may comprise establishing a communication link with a manufacturer of the device of interest (e.g., in a scenario where such a manufacturer is known, for example, by signal, by pattern recognition, by user input, etc.).

In still another exemplary scenario, step 108 may comprise interacting with a user to define and/or establish an initial communication link (e.g., for the exchange of additional information peer-to-peer). Such a communication link may then be established automatically in the future without user interaction. Also for example, step 108 may comprise interacting with a user to set up a relatively basic communication link for the communication of various types of device information, including for example information related to setting up a relatively more advanced communication link (e.g., for the communication of high-speed media information).

In another exemplary scenario, step 108 may comprise (e.g., based on historical network operation and/or interaction with a particular device or device type) guessing the manner in which a particular device may communicate, and then attempting to establish a communication link utilizing the guessed manner.

The established communication link(s) may comprise characteristics of any of a variety of communication link types. For example and without limitation, such communication links may comprise characteristics of RF wireless communication links, wired communication links, non-tethered optical communication links, tethered optical communication links, etc.

Note that step 108 may comprise establishing such one or more communication links utilizing a standard protocol comprising characteristics specifically tailored to communication of the various types of information discussed herein (e.g., device identity information, device location information, protocol information, user interface information, source information, additional information, etc.). For example, step 108 may comprise utilizing a communication protocol (e.g., layered on top of a lower layer PHY/MAC protocol) that comprises specific protocol elements (e.g., messages, data fields, message exchange sequences, etc.) dedicated to any or all of such types of information. In such an exemplary scenario, for example, different types of devices may then communicate with an access point, central controller, remote user device, etc. using a common protocol. As a non-limiting example, such common protocol may comprise a data element in a standard format dedicated to device location information and/or any of the other forms of information discussed herein. Also for example, such a common protocol may comprise a data record that includes any combination of the different types of information discussed herein. Note that such standard common protocol may apply to communication between any of the devices discussed herein (e.g., device to access point, device to user device, access point to user device, device to network controller, network controller to user device, device to device, etc., directly and/or indirectly via intervening network elements).

In general, step 108 comprises establishing one or more communication links with a device of interest. Accordingly, the scope of various aspects of the present invention should not be limited by characteristics of any particular manner of performing such monitoring unless explicitly claimed.

The method 100 may, for example at step 110, comprise receiving device identity information. Step 110 may comprise receiving the device identity information from a device of interest (e.g., with which a communication link was established at step 108), from another device that is communicatively coupled to the device of interest, from a manufacturer of the device of interest, etc. Step 110 may comprise receiving the device identity information from an access point, a network controller, a gateway, a server, etc., where such entities are communicatively coupled to the device of interest. Such device identity information may comprise any of a variety of characteristics, and step 110 may comprise receiving such information in a variety of manners, non-limiting examples of which will now be provided.

Such device identity information may, for example, comprise information indicating the general type of the device (e.g., television, television receiver, set top box, satellite receiver, stereo, thermostat, light control, electrical switch, kitchen appliance, telephone, other home appliance, etc.). Such device identity information may, for example, comprise information indicating the manufacturer of the device, model number of the device, serial number of the device, etc. Such device identity information may also, for example, comprise information describing the appearance of the device (e.g., size, dimensions, color, shape, distinctive features, lights, heat signature, etc.). Such device identity information may additionally, for example, comprise information describing characteristics of emissions from such device that may be utilized to identify such device (e.g., light emissions, RF emissions (e.g., beacon characteristics, modulation characteristics, signal strength characteristics, signal timing characteristics, spectral signature characteristics, signal frequency characteristics, signal power characteristics, etc.)).

Step 110 may comprise receiving the device identity information in any of a variety of manners. For example, step 110 may comprise receiving such information via one or more communication links (e.g., as established at step 108, established specifically for the purpose of implementing step 110, etc.).

Step 110 may also, for example, comprise receiving such information and/or additional information from a user. Step 110 may also, for example, comprise presenting previously input device information to a user for modification by the user and/or for user-approval of a modification desired by the system implementing the method 100. As a non-limiting example, a user may approve the updating of device identity information that has changed (e.g., due to upgrading, capability enhancements, etc.). As a non-limiting example, step 110 may comprise (e.g., in response to system identification of a device) presenting a GUI to a user, where such GUI presents information of the device acquired by the system. The user may then, for example, approve, disapprove, amend and/or append to such device information.

Additionally, for example, step 110 may comprise receiving device identity information from a user. For example, step 110 may comprise presenting device identity information to a user and receiving device identity information via user selection of such presented identity information. For example, step 110 may comprise presenting the user with a list of devices detected by the system (e.g., presently, during a past period of time, at a past point in time, etc.) and/or various characteristics thereof.

Step 110 may also, for example, comprise presenting previously input device information to a user for modification by the user. As a non-limiting example, a user may update device identity information that has changed (e.g., due to upgrading, capability enhancements, etc.). As a non-limiting example, step 110 may comprise (e.g., in response to a user identification of a previously-defined device) presenting a graphical user interface ("GUI") to a user, where such GUI presents information of the device previously entered by the user and/or acquired automatically in some manner. The user may then, for example, amend and/or append to such device information.

In general, step 110 may comprise receiving device identity information. Accordingly, the scope of various aspects of the present invention should not be limited by characteristics of any particular manner of receiving such information, nor by any particular characteristics of such information, unless explicitly claimed.

The exemplary method 100 may, for example at step 120, comprise receiving device location information. Such device identity information may be received from the device itself, from another device that is communicatively coupled to the device, from a manufacturer of the device, etc.

Such device location information may comprise characteristics of any of a variety of different types of location information. For example and without limitation, such location information may comprise coordinate information associated with the device's location (e.g., global coordinates, coordinates relative to a local reference point, identification of premises at which the device is located, identification of room in which the device is located, identification of a specific location of a premise and/or room, etc.).

Such device location information may, for example, comprise 2-dimensional and/or 3-dimensional information. For example and without limitation, a premises coordinate system may be established, in which a device location may be indicated by information specifying a position on a floor plane and a height above such a floor plane. For example, a device may be located on a shelf of an entertainment center, a kitchen counter, a desk, a bookshelf, a nightstand, on a wall at a particular height, mounted to a wall and/or ceiling, etc.

Such device location information may, for example, also comprise information indicating whether a device is a relatively stationary device ((e.g., a large television, thermostat, desktop computer, home stereo system component, television receiver, etc.), the position of which will change relatively rarely) or a relatively portable device (e.g., a notebook computer, television remote controller, small kitchen appliance, etc.), the position of which will change relatively frequently). Such information may, for example, be useful for system components that may be tasked with tracking the location of devices.

Such device location information may also comprise information indicating orientation of the device (e.g., yaw, pitch and/or roll) in a global reference system and/or local reference system. Such device location information may further, for example, comprise spatial information defining a 3-dimensional volume (or 2-dimensional area) to be associated with the device. For example, such device location information may comprise information spatially describing the volume of the device and/or a 3-dimensional volume encompassing the device (e.g., the device volume plus a buffer volume, for example device volume +10%, +20%, n %, etc.).

Step 120 may comprise receiving the device location in any of a variety of manners, non-limiting examples of which will now be presented. For example, step 120 may comprise receiving device location information from a system and/or device external to the system implementing the method 100. Also, for example, step 120 may comprise receiving device location information automatically (i.e., without direct user interaction). For example, step 120 may comprise receiving such information via one or more communication links (e.g., as established at step 108, established specifically for the purpose of implementing step 120, etc.).

Step 120 may, for example, comprise receiving device location information directly from the device, where the device has on-board location determining capability. Also for example, step 120 may comprise receiving device location information directly from the device, where the device has received information describing the device's location from another system (e.g., a position-determining system, for example, a GPS system, A-GPS system, a cellular triangulation system, a premises-based triangulation system, etc.).

Also for example, step 120 may comprise receiving device location information from another device or system that has determined the location of the device of interest (e.g., a satellite-based and/or terrestrial location determination system). For example, step 120 may comprise the system implementing the method 100 interfacing with a location determining system separate from the device (e.g., a position-determining system, for example, a GPS system, A-GPS system, a cellular triangulation system, a premises-based triangulation system, etc.).

Additionally, for example, step 120 may comprise receiving device location information from a component of the system implementing the method 100. For example, step 120 may comprise receiving device location information from a component (or module) of the system that operates to determine location of the device of interest. In such an exemplary scenario, step 120 may comprise processing image information (e.g., utilizing pattern recognition and/or device ranging from a known reference point) to determine position and/or shape of the device of interest. For example, step 120 may comprise performing image edge detection to determine an outline of a device that is included in a camera image. In such a scenario, a plurality of camera images may also be processed to determine a 3-dimensional location/shape/orientation and/or to triangulate the position of the device of interest.

Further for example, step 120 may comprise receiving device location information by, at least in part, interacting with a user. Many examples of such user interaction were provided previously and also provided in provisional patent application Ser. No. 61/323,223, the entirety of which is incorporated herein by reference. Any one or more of such examples may be incorporated into step 120. As non-limiting examples, step 120 may comprise (e.g., upon a user identifying a device in an image) analyzing image details of such device to determine a visual characterization of such device that may be used later in identifying the location of the device. Such characterization of an image may be compared to a subsequent image to determine the existence and/or absence of the characterized device (e.g., performing image recognition operation). Also for example, step 120 may comprise receiving location information (or a portion thereof) via a user interface.

Step 120 may comprise repeating such location-receiving procedures for a plurality of maps and/or images. For example and without limitation, step 120 may comprise performing the above mentioned locating-receiving operations multiple times.

In general, step 120 may comprise receiving device location information. Accordingly, the scope of various aspects of the present invention should not be limited by characteristics of any particular type of location information and/or any particular manner of receiving such information unless explicitly claimed.

The exemplary method 100 may, for example at step 130, comprise receiving additional information to be associated with the device (e.g., from a user, from the device, from a commercial enterprise associated with the device, etc.). Such additional information may comprise any of a variety of characteristics, and step 130 may comprise receiving such additional information in any of a variety of manners, non-limiting examples of which will now be presented.

Such additional information may, for example, comprise characteristics of any of a variety of device-related information. For example and without limitation, such additional information may comprise communication network identity information (e.g., the identity of communication networks to which the device is or may be communicatively coupled).

Also for example, such additional information may comprise communication network address information. For example, a device may correspond to one or more communication network addresses. A device may, for example, be associated with one or more addresses on each communication network through which communication may be established with the device. Such address information may be static address information (e.g., an address always associated with the device, an address always associated with the device on a particular network, etc.), or such address information may be dynamic address information (e.g., an address assigned to the device periodically, upon entry into a particular communication network, upon power-up, upon reset, etc.). Such address information may, for example, be universal address information and/or local address information.

Additionally for example, such additional information may comprise protocol information associated with the device. Such protocol information may, for example, comprise information identifying communication network protocols with which the device may communicate. Such protocol information may also, for example, comprise information identifying protocols other than communication network protocols with which the device may communicate (e.g., protocols associated with communication layers above relatively lower-level communication network protocols (e.g., application layer protocols)).

Further for example, such additional information may comprise information describing bandwidth requirements for communicating with such device. Such bandwidth requirement information may, for example, comprise information of an amount of bandwidth, an indication of whether such bandwidth need be guaranteed and/or non-guaranteed, etc. Such additional information may comprise information describing other communication requirements for the device (e.g., latency requirements or limits, sleep mode behavior, etc.).

Also for example, such additional information may comprise information describing secure communication operation of the device. For example, such information may comprise access code information (e.g., user ID information, password information, etc.). Additionally for example, such information may comprise encryption/decryption key information (e.g., public key information, random number generator seed information, etc.).

Such additional information may, for example, comprise device control information (which may, e.g., be tied in with upper layer protocol information). For example, such device control information may comprise a list of commands to which the device may respond. Such list of commands may, for example, comprise a list of commands that a remote user may communicate to the device to monitor and/or control operation of such device. In a non-limiting exemplary scenario, such command information may comprise a list of commands to turn the device on and/or off, change channels, change audio and/or video output settings, select an audio and/or video input, change temperature, change antenna settings, set a timer, command camera operation, select an audio file and/or video file to play, establish a recording profile for a recording device, set and/or reset a timed alarm, specify operation of home and/or office security systems, monitor any facet of device operation that may be monitored, monitor device output, monitor camera images, monitor temperature, monitor and/or control environmental control systems, etc.

Such additional information may comprise information describing how and/or where to manage information stored in the device (e.g., file structure information, file access information, database information, etc. Also for example, such additional information may comprise information describing internal register addresses for the device that may be accessed by an external device.

Such additional information may, for example, comprise user interface information. As mentioned above, the additional information may comprise command (or monitoring) information. Such additional information may, for example, also comprise information describing how such command information is to be provided to a user and received from the user. For example, such additional information may comprise information describing an order in which command options are to be presented to a user and/or when such command options are to be presented to the user. Also for example, such additional information may comprise information describing which commands to present to the user and in which circumstances such commands are to be presented to the user.

Additionally for example, such additional information may comprise information describing how various command options should be presented to the user. For example, such additional information may comprise detailed descriptions of graphical user interface features to present to the user. For example, such information may comprise graphical descriptors, bitmaps, display location information, color information, settings for cookbook predefined graphical features, etc. For example, in a scenario involving monitoring various characteristics of a device, such additional information may comprise information describing the manner in which monitored characteristics should be presented to the user (e.g., numerical characteristics, size/font characteristics, graphical information output constructs (e.g., graphs, dials, colors, etc.), audio characteristics, etc.).

Note that though step 130 may generally comprise receiving additional information (e.g., from a device of interest, from devices and/or systems associated with a device of interest, etc.), step 130 may also comprise receiving such additional information from a user.

In general, step 130 may comprise receiving additional information to be associated with the device. Accordingly, the scope of various aspects of the present invention should not be limited by characteristics of any particular type of additional information and/or any particular manner of receiving such additional information unless explicitly claimed.

The exemplary method 100 may, at step 140, comprise generating a database (e.g., a data structure organizing the above-mentioned information) relating the information received at steps 110, 120 and 130. Such a database, for example, may be viewed as a description of an environment of selectable devices (e.g., an environment of devices selectable by a user for monitoring and/or controlling). Such a database may comprise any of a variety of characteristics, and step 140 may comprise forming such a database in any of a variety of manners, non-limiting examples of which will now be provided.

For example and without limitation, step 140 may comprise forming a set (e.g., an array or list) of data records, each data record corresponding to a respective device to which a user device may communicatively couple (e.g., directly and/or indirectly via intervening network devices). For example, a record may comprise elements corresponding to any or all of the previously discussed device identity information. Also for example, the record may comprise elements corresponding to any or all of the previously discussed device location information. Additionally for example, the record may comprise elements corresponding to any or all of the previously discussed additional information types.

For example, step 140 may comprise forming an overall data structure in which each of the device records may be indexed (or accessed) according to device location. For example, the overall data structure may be sorted in an array (or linked list and/or tree structure) or other database of records such that a specified location may be utilized to retrieve a respective record of a device positioned at such location.

Also for example, step 140 may comprise linking area regions of one or more 2-D images to respective device records. Such regions may, for example, be as defined by a user at step 120. Additionally for example, step 140 may comprise linking a graphical construct in a 2-D and/or 3-D map to a respective device record.

Step 140 may, for example, comprise providing an interface by which other system components (e.g., system components within a system device implementing the method 100 or separate from such a system device) may access such database. For example, step 140 may comprise providing a hardware mechanism (e.g., solely hardware and/or hardware executing software instructions and/or processing data structure information) by which other systems may utilize the formed data structure.

Also for example, step 140 may comprise providing such an interface mechanism (e.g., a suite of access methods) in the form of processor instructions that, when executed by a processor cause the processor to provide the record access functionality. Such instructions may, for example, be stored in a computer-readable medium (e.g., a non-transitory medium).

In a non-limiting exemplary scenario, step 140 may comprise providing a search interface by which a system component may input an identified location and output, in response to such input identified location, information associated with the device at such input identified location (e.g., any or all of the information discussed above). For example, step 140 may comprise providing an interface mechanism that operates to receive location information and returns networking information for a device located at the received location. Further for example, step 140 may comprise providing an interface mechanism that operates to receive location information and return protocol information associated with a device at such location. Additionally for example, step 140 may comprise providing an interface mechanism that operates to receive location information and return control information associated with a device at such location. Also for example, step 140 may comprise providing an interface mechanism that operates to receive location information and return user interface information associated with a device at such location. The discussion below will present a variety of non-limiting illustrations of the utilization and/or operation of such a search interface.

The database (or data structure) may be generally organized by device location. A top layer of such organization may, for example, comprise one or more images and/or maps of a geographical area (e.g., of a premises, room, office, campus, etc.). In a first exemplary scenario, the device environment may be described at a top layer in terms of a map (e.g., a 2-D and/or 3-D map) of a geographical area (e.g., a premises, office, room, campus, etc.) that shows objects corresponding to the various devices. Indication one of such objects (e.g., by a user interacting with one or more of such maps) may, for example, provide access to any of the variety of types of information discussed above associated with such device. In a second exemplary scenario, the device environment may be described at a top layer in terms of one or more camera images on which particular points, areas or sub-images may correspond to the various devices. Indication of one of such objects (e.g., by a user interacting with such one or more camera images) may, for example, provide access to any of the variety of information discussed above associated with such device. In either of the above-mentioned scenarios, step 140 may comprise providing a user interface mechanism (e.g., a GUI) by which a user may indicate a feature on a map and/or image. Such scenarios will be described in more detail below.

In general, step 140 may comprise generating a database (or other data structure) relating the information received at steps 110, 120 and 130. Accordingly, the scope of various aspects of the present invention should not be limited by characteristics of any particular database (or data structure) characteristics and/or any particular manner of forming and/or utilizing such a database unless explicitly claimed.

The exemplary method 100 may, for example at step 195, comprise performing continued operational steps. Such continued operation may comprise any of a variety of types of continued operation, non-limiting examples of which will now be provided.

Step 195 may, for example, comprise looping execution flow of the exemplary method 100 to any previous step. Also for example, step 195 may comprise utilizing the information received at steps 110, 120 and 130, and/or the database or data structure formed at step 140. Step 195 may comprise performing such utilization in any of a variety of manners (e.g., remote device identification, network formation, remote control, etc.).

Step 195 may, for example, comprise managing a network of user-selectable devices described in the database formed at step 140 in any of a variety of manners, non-limiting examples of which are provided in U.S. patent application Ser. No. 13/042,133, filed concurrently herewith, titled "SYSTEM AND METHOD FOR MANAGING A NETWORK OF USER-SELECTABLE DEVICES", the contents of which are hereby incorporated herein by reference in their entirety. Also for example, step 195 may comprise providing for remote user selection of and/or interaction with a user-selectable device described in the database formed at step 140 in any of a variety of manners, non-limiting examples of which are provided in U.S. patent application Ser. No. 13/042,198, filed concurrently herewith, titled "SYSTEM AND METHOD PROVIDING REMOTE USER SELECTION OF A DEVICE", the contents of which are hereby incorporated herein by reference in their entirety. Additionally for example, step 195 may comprise providing for remote monitoring and/or controlling devices described in the database formed at step 140 in any of a variety of manners, non-limiting examples of which are provided in U.S. patent application Ser. No. 13/042,223, filed concurrently herewith, titled "SYSTEM AND METHOD IN A NETWORK CONTROLLER FOR REMOTELY MONITORING AND/OR CONTROLLING DEVICES", the contents of which are hereby incorporated herein by reference in their entirety.

Figure 2:
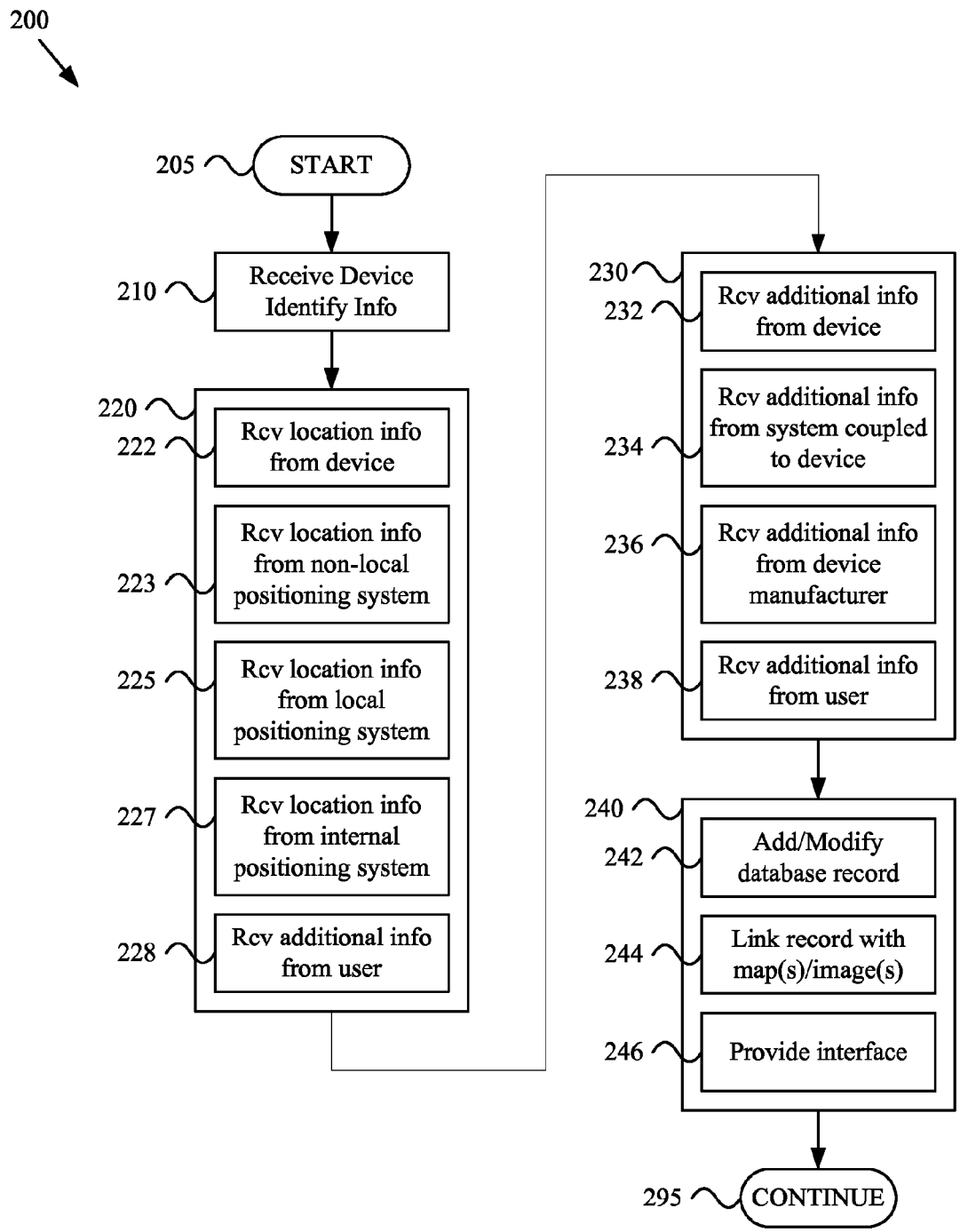
FIG. 2 shows a flow diagram of a non-limiting exemplary method for automatically maintaining a network of user-selectable devices and/or a database characterization thereof, in accordance with various aspects of the present invention.

FIG. 2 shows a flow diagram of a non-limiting exemplary method 200 for automatically maintaining a network of user-selectable devices and/or a database characterization thereof, in accordance with various aspects of the present invention. The exemplary method 200 may share any or all aspects with the exemplary method 100 discussed previously.

The exemplary method 200 may, for example at steps 205-210, share any or all aspects with steps 105-110 of the exemplary method 100 illustrated in FIG. 1 and discussed previously. The exemplary method 200 may, for example at step 220, comprise receiving device location information from a user. Step 220 may, for example, share any or all characteristics with step 120 discussed above.

The exemplary method 200 may, for example at step 220, comprise receiving device location information. Step 220 may share any or all characteristics with step 120 illustrated in FIG. 1 and discussed above. In a non-limiting exemplary scenario, step 220 may comprise performing any one or more of a plurality of sub-steps, non-limiting examples of which will now be provided.

Step 220 may, for example at sub-step 222, comprise receiving location information of the device directly from the device. Examples of such receiving were presented above. Step 220 may, for example at sub-step 223, comprise receiving location information of the device from a non-local positioning system (e.g., a global positioning system, a cellular telecommunication network-based positioning system, etc.) associated with the device. Examples of such receiving were presented above. Step 220 may, for example at sub-step 225, comprise receiving location information from one or more components of a local positioning system (e.g., a triangulation-based positioning system located in the general vicinity of the device of interest). Examples of such receiving were presented above. Step 220 may, for example at sub-step 227, comprise receiving location information from a local positioning system based on determining device direction and distance to the device. Examples of such receiving were presented above (e.g., utilizing image recognition and determining distance to a recognized image). Step 220 may, for example at sub-step 228, comprise receiving location information from a user. Examples of such receiving were presented above.

In general, step 220 may comprise receiving device location information. Step 220 may share any or all characteristics with step 120 discussed above. Accordingly, the scope of various aspects of the present invention should not be limited by characteristics of any particular type of location information and/or any particular manner of receiving such information unless explicitly claimed.

The exemplary method 200 may, for example at step 230, comprise receiving additional information to be associated with the device. Step 230 may, for example, share any or all aspects with step 130 of the exemplary method 100 illustrated in FIG. 1 and discussed previously. In a non-limiting exemplary scenario, step 230 may comprise performing any one or more of a plurality of sub-steps, non-limiting examples of which will now be provided.

Step 230 may, for example at sub-step 232, comprise receiving such additional information from the device of interest. Various examples of such receiving were provided previously. Step 230 may, for example at sub-step 234, comprise receiving such additional information from another device or system that is communicatively coupled to the device of interest. Various examples of such receiving were provided previously. Step 230 may, for example at sub-step 236, comprise receiving such additional information from a manufacturer of the device of interest. Various examples of such receiving were provided previously. Step 230 may, for example at sub-step 238, comprise receiving at least a portion of such additional information from a user. Various examples of such receiving were provided previously.

In general, step 230 may comprise receiving additional information to be associated with the device. Accordingly, the scope of various aspects of the present invention should not be limited by characteristics of any particular type of additional information and/or any particular manner of receiving such information unless explicitly claimed.

The exemplary method 200 may, for example at step 240, comprise generating a database (or other data structure) relating the information received at steps 210, 220 and 230. Such a database, for example, may be viewed as a description of an environment of selectable devices. Step 240 may, for example, share any or all characteristics with step 140 discussed previously.

Step 240 may, for example at sub-step 242, comprise maintaining database records associated with one or more devices. Sub-step 242 may comprise forming (e.g., adding and/or modifying) records comprising any or all of the information discussed above relating to various devices in the environment. Such database records may, for example, be stored in a non-transitory computer-readable medium (e.g., in a non-volatile memory) of a network controller or manager, a mobile/portable computing device of the user, etc.).

Step 240 may, for example at sub-step 244, comprise linking the respective database records with respective location information for the respective devices. For example, device records may be linked with 2-D and/or 3-D coordinate and/or mapping information, regions of one or more camera images (which may also be stored in the database), etc.

Step 240 may, for example, at sub-step 246, comprise providing an interface by which other system components may utilize the data structures stored in the database. As discussed previously, such an interface may, for example, comprise modules that operate to retrieve particular information about a device provided location information, and any of a variety of other interfaces. Such interfaces may, for example, comprise hardware and/or a combination of hardware and software. For example, such modules may comprise software routines and/or interface definitions that, when executed by a processor, cause the processor to provide the desired interface. Such routines and/or interface definitions may, for example, be stored in a non-transitory computer-readable medium of a network controller or manager, a mobile/portable computing device of the user, etc.). Such routines and/or interface definitions may, for example, be stored in a same memory device as the database records discussed above, may be stored in separate memory devices and/or may be stored in separate and remotely located memory devices.

In general, step 240 may comprise generating a database (or other data structure) relating the information received at steps 210, 220 and 230. Accordingly, the scope of various aspects of the present invention should not be limited by characteristics of any particular database (or data structure) characteristics and/or any particular manner of forming and/or utilizing such a database unless explicitly claimed.

The exemplary method 200 may, for example at step 295, comprise performing continued operational steps. Step 295 may, for example, share any or all aspects with step 195 of the exemplary method 100 illustrated in FIG. 1 and discussed previously.

Figure 3:
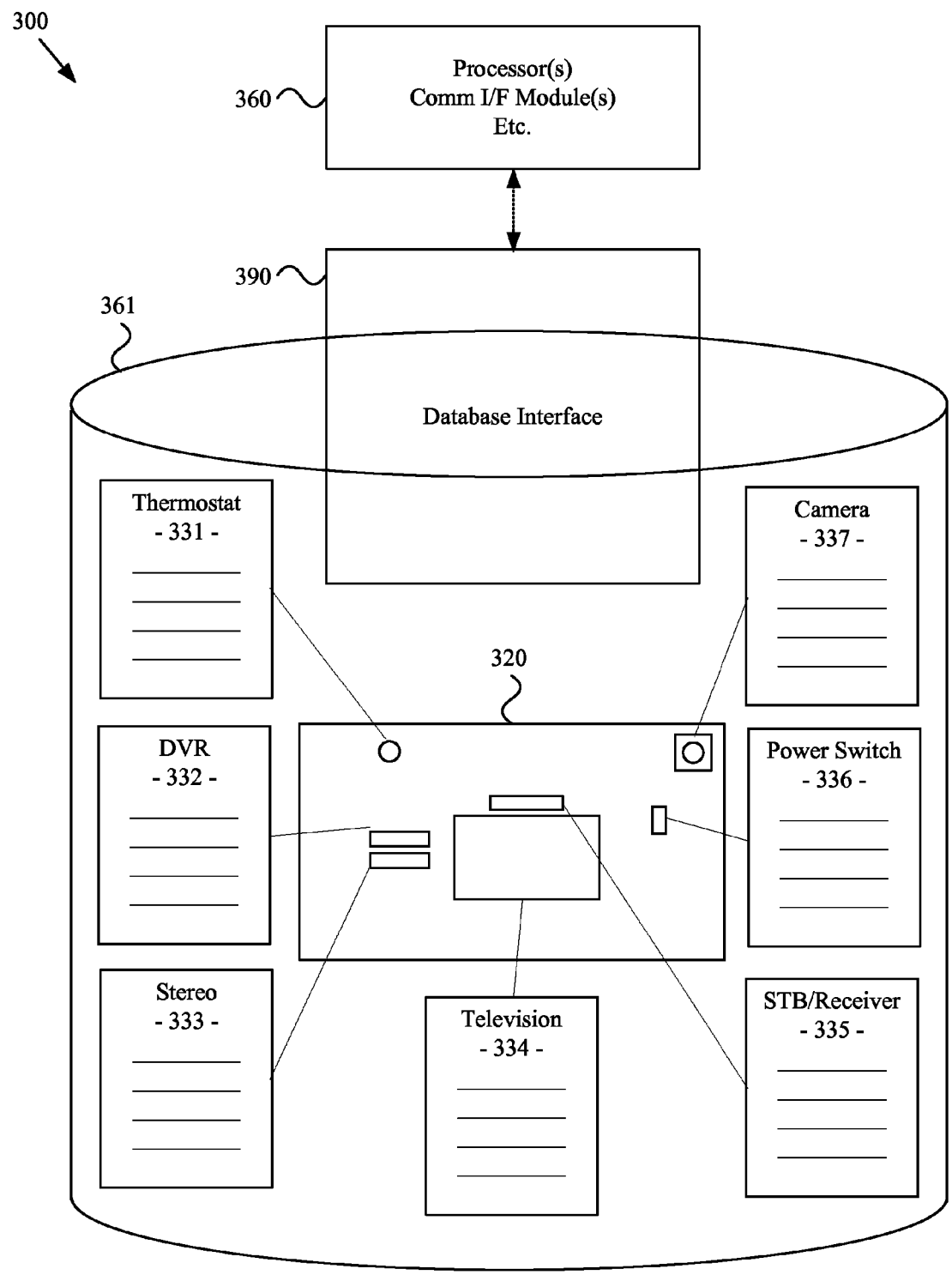
FIG. 3 shows a block diagram of a non-limiting exemplary database for automatic network maintenance and/or characterization, in accordance with various aspects of the present invention.

FIG. 3 shows a block diagram 300 of a non-limiting exemplary database for automatic network maintenance and/or characterization, in accordance with various aspects of the present invention.

The previous discussion (e.g., the discussion of steps 140 and 240) mentioned the formation and/or maintenance of a database where devices of an image and/or map may be related to respective device records that include any of a variety of types of device information (many examples of which were provided above). For example, the database may comprise a memory 361. Such memory 361 may, for example, be a non-volatile memory (or other non-transitory data retention device), such as a magnetic disk hard drive, optical disk drive, CD, DVD, laser disc, Blueray disc, diskette, flash drive, EPROM, EEPROM, flash memory, etc.

The memory 361 may, in the illustrated example, include information of an image 320 (or map or plurality of images or maps), where areas or features of the image may be related to records, which may also be stored in the memory 361. For example, the image 320 may comprise a still photograph or other camera image.

The image 320 may comprise an image of a thermostat that is linked to a thermostat record 331. The image 320 may also comprise an image of a DVR that is logically linked to a DVR record 332, an image of a stereo that is logically linked to a stereo record 333, an image of a television that is logically linked to a television record 334, an image of a set top box ("STB") and/or TV receiver that is logically linked to an STB/Receiver record 335, an image of a power switch that is logically linked to a power switch record 336 and an image of a camera that is logically linked to a camera record 337. As discussed previously, the devices of the image 320 (or environment) may be defined by respective areas (e.g., boxes, outlines, etc.) input by a user and/or automatically defined (e.g., utilizing pixel analysis).

Also as discussed previously in the discussion of the methods of FIGS. 1 and 2, various aspects of the present invention may comprise providing a database interface 390 by which other processes may access and utilize the information stored in the memory 361. As discussed previously, such interface 390 may be implemented in a variety of manners. For example, such interface 390 may be implemented by a processor 360 or other hardware device executing instructions, which may, for example, be stored in the memory 361 or another memory (e.g., either collocated with the memory 361 or geographically distinct from the memory 361. The database interface 390 may comprise modules stored in a variety of locations (e.g., at a central controller, server, gateway, access point, and/or user computing device).

The system 300 illustrated in FIG. 3 also comprises one or more processors, communication interface modules, or any other hardware components 360 that may interact with the memory 361 via the database interface 390.

Figure 4:
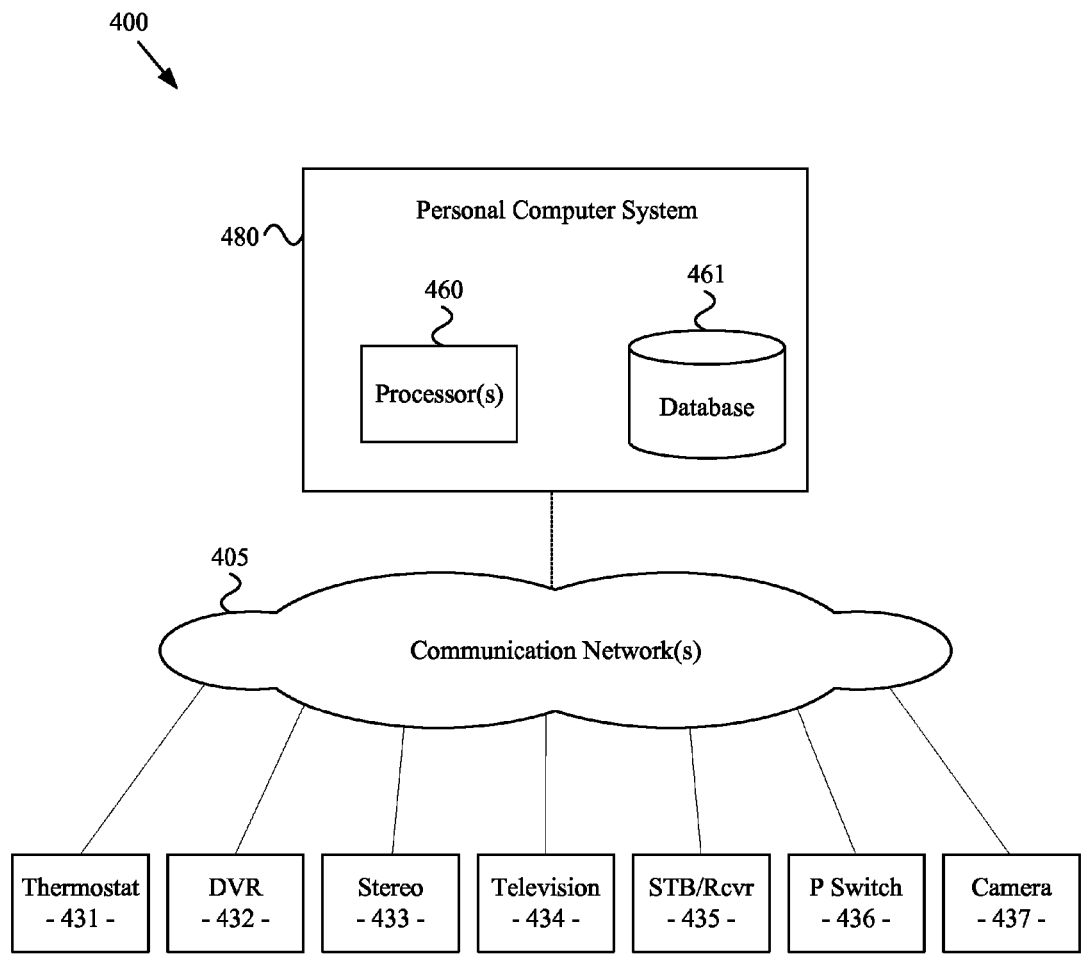
FIG. 4 shows a block diagram of a non-limiting exemplary system for automatically maintaining a network of user-selectable devices and/or a database characterization thereof, in accordance with various aspects of the present invention.

FIG. 4 shows a block diagram of a non-limiting exemplary system 400 for automatically maintaining a network of user-selectable devices and/or a database characterization thereof, in accordance with various aspects of the present invention. The exemplary system 400 (or components thereof) may operate to perform any or all of the functional characteristics discussed herein (e.g., with regard to the exemplary methods 100 and 200, with regard to the exemplary database 300, etc.).

The exemplary system 400 may, for example, comprise a personal computer system 480, which is communicatively coupled to a variety of devices via one or more communication networks 405 (e.g., the Internet, a telecommunication network, cable television network, satellite communication network, local area network, personal area network, metropolitan area network, wide area network, campus network, home network, etc.). Such network(s) may, for example, be wired, wireless RF, tethered optical, non-tethered optical, etc.

As a non-limiting example, the personal computer system 480 (e.g., a laptop or notebook computer, desktop computer, handheld computer, cellular telephone with computing capability, personal digital assistant, etc.) may comprise one or more processors 460 and a database 461. The personal computer system 480 may, for example, operate to perform any or all of the method steps discussed previously. For example, the database 461 may comprise any or all database characteristics discussed herein.

The personal computer system 480 may, for example, operate to maintain a network, and/or characterization thereof (e.g., in the database 461), that comprises any or all of the previously exemplified thermostat 431, DVR 432, stereo 433, television 434, STB/Rcvr 435, power switch 436 and camera 437. As a non-limiting example, the processor 460 may operate to maintain a network and/or network characterization thereof (e.g., in the database 461) comprising any or all of such devices.

For example, the personal computer system 480 may, for example, operate to detect the presence and/or changing presence characteristics of any of the devices (e.g., utilizing a camera 437, communicating signals, etc.), in response to which the personal computer system 480 (or component thereof) may interface with the database 461 to retrieve information about the selected device. The personal computer system 480 may then (e.g., utilizing a communication module) operate to establish a communication link with the detected device and provide the capability to monitor and/or control the selected device.

Figure 5:
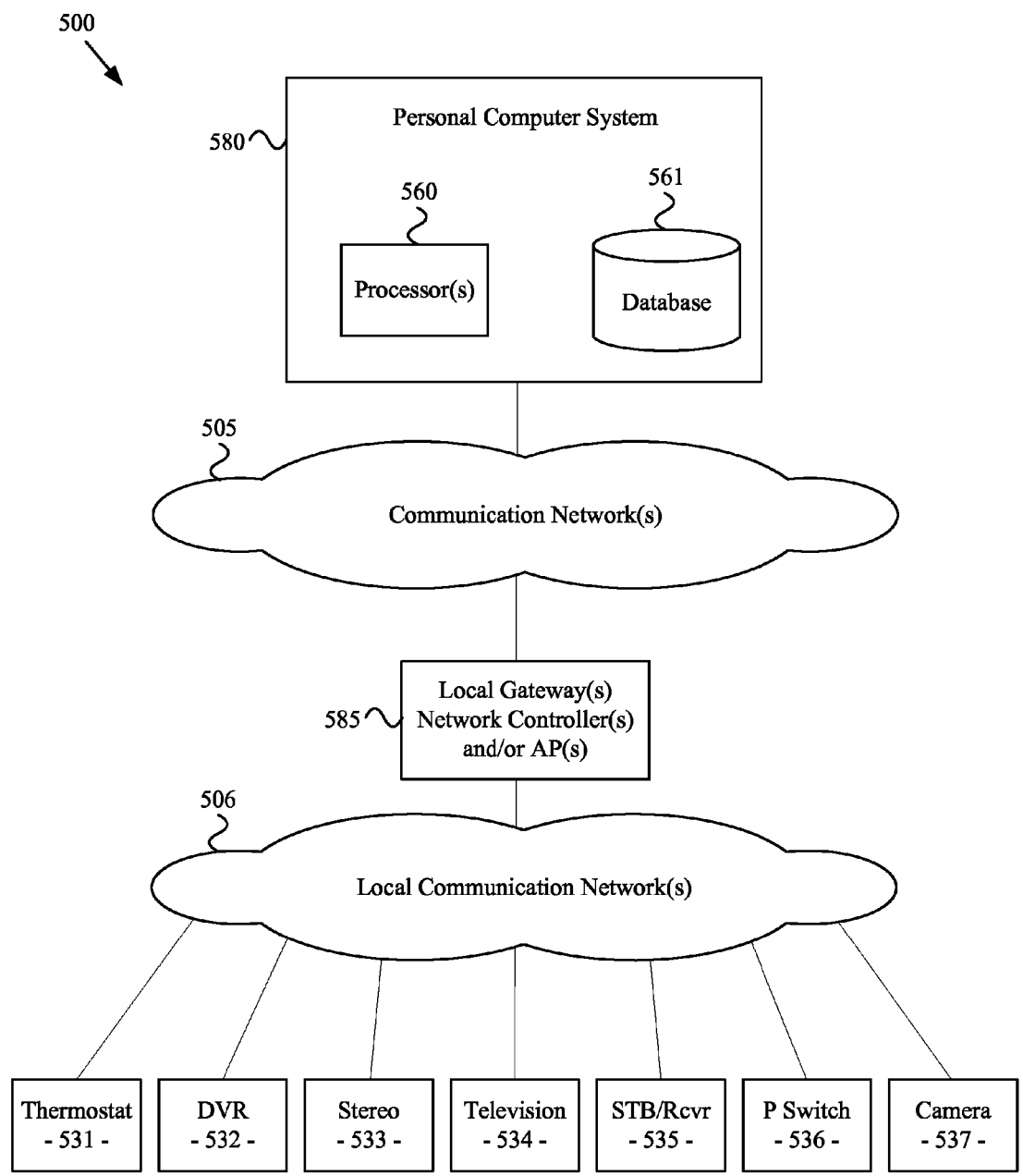
FIG. 5 shows a block diagram of a non-limiting exemplary system for automatically maintaining a network of user-selectable devices and/or a database characterization thereof, in accordance with various aspects of the present invention.

FIG. 5 shows a block diagram of a non-limiting exemplary system 500 for automatically maintaining a network of user-selectable devices and/or a database characterization thereof, in accordance with various aspects of the present invention. The exemplary system 500 (or components thereof) may operate to perform any or all of the functional characteristics discussed herein (e.g., with regard to the exemplary methods 100 and 200 illustrated in FIGS. 1 and 2, with regard to the exemplary database illustrated in FIG. 3, with regard to the exemplary system 400 illustrated in FIG. 4, etc.).

The exemplary system 500 may, for example, comprise a personal computer system 580, which is communicatively coupled to a gateway, network controller and/or access point 585 via one or more communication networks 505 (e.g., the Internet, a telecommunication network, cable television network, satellite communication network, local area network, personal area network, metropolitan area network, wide area network, campus network, home network, etc.). Such network(s) may, for example, be wired, wireless RF, tethered optical, non-tethered optical, etc.

The gateway, network controller and/or access point 585, in turn, is communicatively coupled to a variety of devices via one or more local communication networks 506 (e.g., local area network(s), personal area network(s), home network(s), office network(s), etc.). Such local communication network(s) may, for example, be wired, wireless RF, tethered optical, non-tethered optical, etc.

As a non-limiting example, the personal computer system 580 (e.g., a laptop or notebook computer, desktop computer, handheld computer, cellular telephone with computing capability, personal digital assistant, etc.) may comprise one or more processors 560 and a database 561. The personal computer system 580 may, for example, operate to perform any or all of the method steps discussed previously. For example, the database 561 may comprise any or all database characteristics discussed herein.

The personal computer system 580 may, for example, operate to maintain a network, and/or characterization thereof (e.g., in the database 561), that comprises any or all of the previously exemplified thermostat 531, DVR 532, stereo 533, television 534, STB/Rcvr 535, power switch 536 and camera 537. As a non-limiting example, the processor 560 may operate to maintain a network and/or network characterization thereof (e.g., in the database 561), comprising any or all of such devices.

For example, the personal computer system 580 may, for example, operate to detect the presence and/or changing presence characteristics of any of the devices (e.g., utilizing a camera 537, communicating signals, etc.), in response to which the personal computer system 580 (or component thereof) may interface with the database 561 to retrieve information about the selected device. The personal computer system 580 may then (e.g., utilizing a communication module) operate to establish a communication link with the detected device via the communication network(s) 505; local gateway, network controller and/or access point 585; and communication network(s) 506; and provide the capability to monitor and/or control the selected device.

Figure 6:
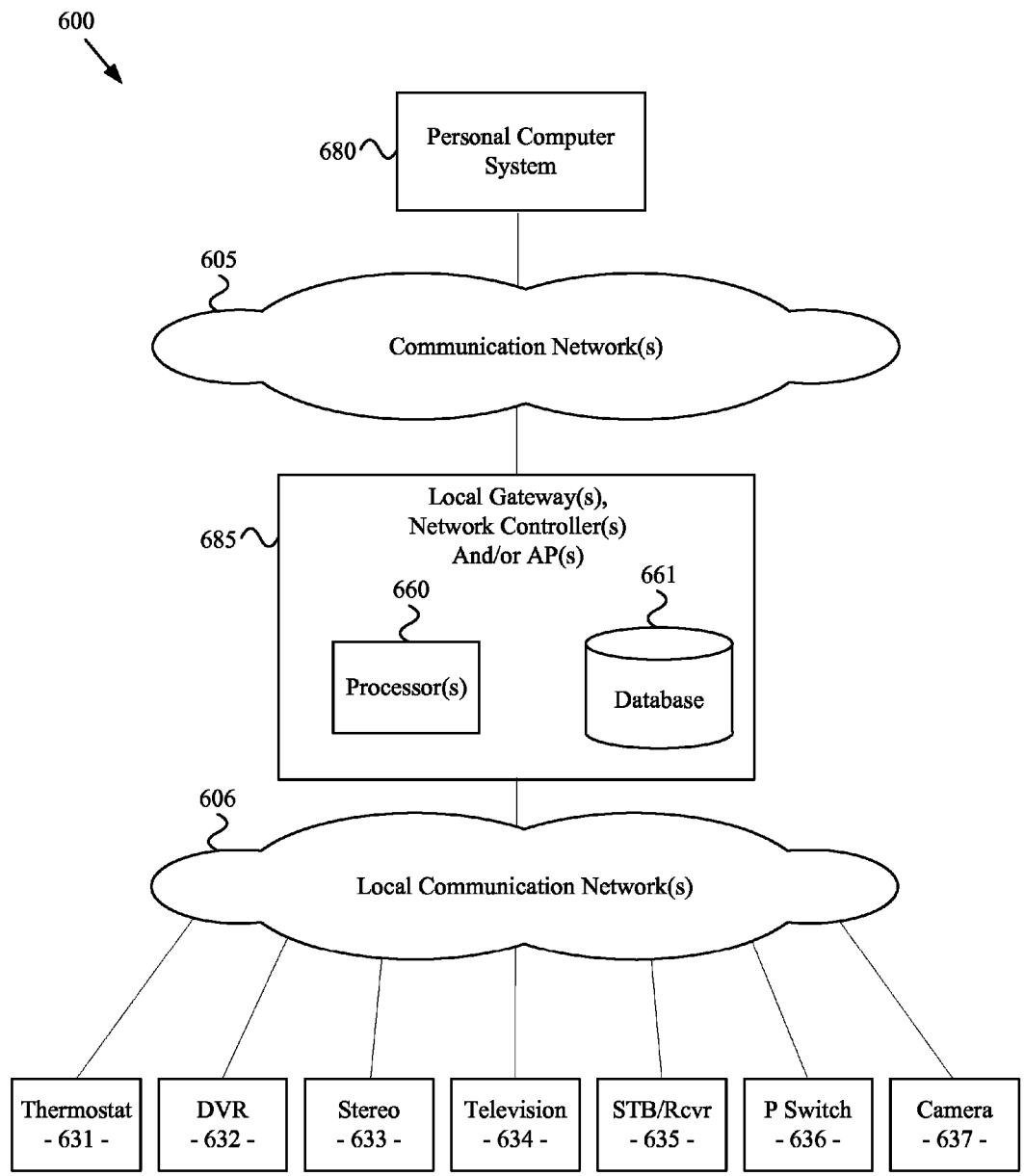
FIG. 6 shows a block diagram of a non-limiting exemplary system for automatically maintaining a network of user-selectable devices and/or a database characterization thereof, in accordance with various aspects of the present invention.

FIG. 6 shows a block diagram of a non-limiting exemplary system 600 for automatically maintaining a network of user-selectable devices and/or a database characterization thereof, in accordance with various aspects of the present invention. The exemplary system 600 (or components thereof) may operate to perform any or all of the functional characteristics discussed herein (e.g., with regard to the exemplary methods 100 and 200 illustrated in FIGS. 1 and 2, with regard to the exemplary database illustrated in FIG. 3, with regard to the exemplary systems 400 and 500 illustrated in FIGS. 4 and 5, etc.).

The exemplary system 600 may, for example, comprise a personal computer system 680, which is communicatively coupled to a gateway, network controller and/or access point 685 via one or more communication networks 605 (e.g., the Internet, a telecommunication network, cable television network, satellite communication network, local area network, personal area network, metropolitan area network, wide area network, campus network, home network, etc.). Such network(s) may, for example, be wired, wireless RF, tethered optical, non-tethered optical, etc.

The gateway, network controller and/or access point 685, in turn, is communicatively coupled to a variety of devices via one or more local communication networks 606 (e.g., local area network(s), personal area network(s), home network(s), office network(s), etc.). Such local communication network(s) may, for example, be wired, wireless RF, tethered optical, non-tethered optical, etc.

As a non-limiting example, the gateway, network controller and/or access point 685 may comprise one or more processors 660 and a database 661. The gateway, network controller and/or access point 685 may, for example, operate to perform any or all of the method steps discussed previously. For example, the database 661 may comprise any or all database characteristics discussed herein.

The gateway, network controller and/or access point 685 may, for example, operate to maintain a network, and/or characterization thereof (e.g., in the database 661), that comprises any or all of the previously exemplified thermostat 631, DVR 632, stereo 633, television 634, STB/Rcvr 635, power switch 636 and camera 637. As a non-limiting example, the processor 660 may operate to maintain a network and/or network characterization thereof (e.g., in the database 661) comprising any or all of such devices.

For example, the personal computer system 680 may, for example, operate to detect the presence and/or changing presence characteristics of any of the devices (e.g., utilizing a camera 637, communicating signals, etc.), in response to which the gateway, network controller and/or access point 685 (or component thereof) may interface with the database 661 to retrieve information about the selected device. The gateway, network controller and/or access point 685 may then (e.g., utilizing one or more communication modules) operate to establish a communication link with the selected device via the communication network(s) 606, and establish a communication pathway between the personal computer system 680 and the selected device. The local gateway, network controller and/or access point 685 may then operate to provide the capability to monitor and/or control the selected device.

Note that, as opposed to the exemplary systems 400, 500 illustrated in FIGS. 4 and 5, the exemplary system 600 locates most of the previously discussed functionality in the gateway, network controller and/or access point 685 (e.g., as opposed to the personal computer system 680). Such an implementation may, for example, remove system complexity from the personal computer 680, which may for example have limited energy, memory and/or processing capabilities, and place such complexity in a central location. Such an arrangement also provides for a plurality of personal computer systems to perform the disclosed operation with a minimum of additional complexity.

Figure 7:
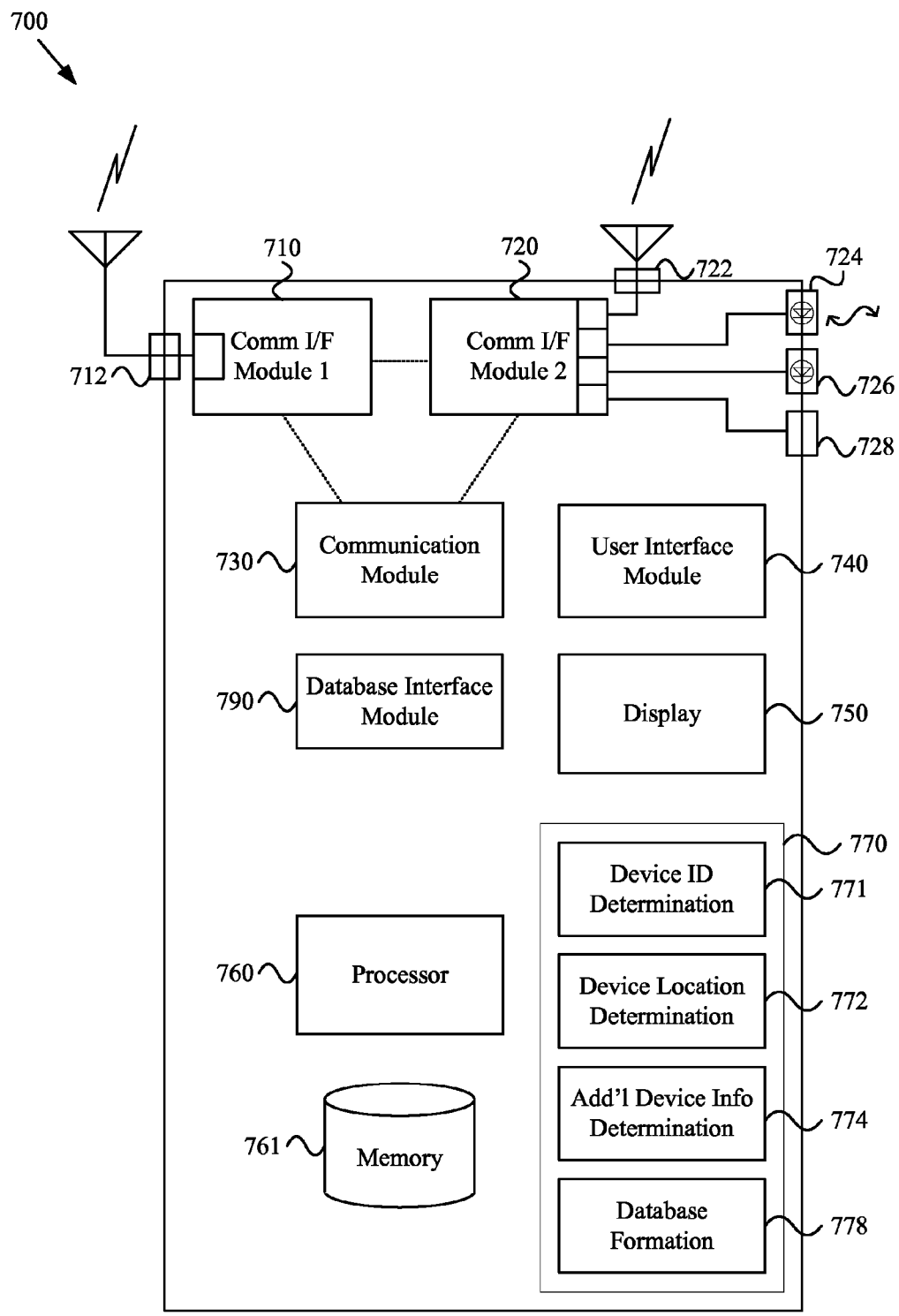
FIG. 7 shows a block diagram of a non-limiting exemplary device for automatically maintaining a network of user-selectable devices and/or a database characterization thereof, in accordance with various aspects of the present invention.

FIG. 7 shows a block diagram of a non-limiting exemplary device (or system) 700 for automatically maintaining a network of user-selectable devices and/or a database characterization thereof, in accordance with various aspects of the present invention. The exemplary device 700 (or various components thereof) may, for example, operate to perform any or all functionality discussed previously with regard to FIGS. 1-6. Also for example, the exemplary device 700 may share any or all characteristics with the database system 300 and/or personal computer systems 480, 580 and 680 discussed previously. Additionally for example, the exemplary device 700 may share any or all characteristics with the local gateways, remote controllers and/or access points 585, 685 discussed previously. Further for example, the exemplary device 700 may share any or all characteristics with the exemplary device (e.g., terminal devices) 331-337, 431-437, 531-537 and 631-637 discussed previously.

The exemplary device 700 may, for example, comprise a first communication interface module 710. The first communication interface module 710 may, for example, operate to communicate over any of a variety of communication media and utilizing any of a variety of communication protocols. For example, though the first communication interface module 710 is illustrated coupled to a wireless RF antenna via a wireless port 712, the wireless medium is merely illustrative and non-limiting. The first communication interface module 710 may, for example, operate to communicate with one or more communication networks (e.g., cable television networks, satellite television networks, telecommunication networks, the Internet, local area networks, personal area networks, metropolitan area networks, etc.) via which data is communicated.

The exemplary device 700 comprises a second communication interface module 720. The second communication interface module 720 may, for example, operate to communicate over any of a variety of communication media and utilizing any of a variety of communication protocols. For example, the second communication interface module 720 may communicate via a wireless RF communication port 722 and antenna, or may communicate via a non-tethered optical communication port 724 (e.g., utilizing laser diodes, photodiodes, etc.). Also for example, the second communication interface module 720 may communicate via a tethered optical communication port 726 (e.g., utilizing a fiber optic cable), or may communicate via a wired communication port 728 (e.g., utilizing coaxial cable, twisted pair, HDMI cable, Ethernet cable, any of a variety of wired component and/or composite video connections, etc.). The second communication interface module 720 may, for example, operate to communicate with one or more communication networks (e.g., cable television networks, satellite television networks, telecommunication networks, the Internet, local area networks, personal area networks, metropolitan area networks, etc.) via which data is communicated. Also for example, the second communication module 720 may operate to communicate with local devices.

The exemplary device 700 may also comprise additional communication interface modules, which are not illustrated. Such additional communication interface modules may, for example, share any or all aspects with the first 710 and second 720 communication interface modules discussed above.

The exemplary device 700 may also comprise a communication module 730. The communication module 730 may, for example, operate to control and/or coordinate operation of the first communication interface module 710 and the second communication interface module 720 (and/or additional communication interface modules as needed). The communication module 730 may, for example, provide a convenient communication interface by which other components of the device 700 may utilize the first 710 and second 720 communication interface modules. Additionally, for example, in an exemplary scenario where a plurality of communication interface modules are sharing a medium and/or network, the communication module 730 may coordinate communications to reduce collisions and/or other interference between the communication interface modules 710, 720. The communication module 730 may, for example, operate to utilize one or more of the communication interface modules 710, 720 to perform any or all of the communication functionality discussed herein (e.g., with regard to any of the steps illustrated in FIGS. 1 and 2 and discussed previously).

The exemplary device 700 may additionally comprise one or more user interface modules 740. The user interface module(s) 740 may generally operate to provide user interface functionality to a user of the device 700. For example, the user interface module(s) 740 may operate to perform any or all of the exemplary user interface functionality discussed herein (e.g., with regard to any of FIGS. 1-6). For example, and without limitation, the user interface module(s) 740 may operate to provide for user control of any or all standard device commands. The user interface module(s) 740 may, for example, operate and/or respond to user commands utilizing user interface features disposed on the device 700 (e.g., buttons, touch screen, microphone, etc.) and may also utilize the communication module 730 (and/or first 710 and second 720 communication interface modules) to communicate with the device 700 and/or any device that is communicatively coupled thereto (e.g., to control any monitoring and/or controlling functionality discussed herein). The user interface module 740 may also operate to interface with and/or control operation of any of a variety of sensors that may be utilized to ascertain an on-screen pointing location. As discussed elsewhere herein, the user may specify location and/or other characteristics of a device.

The exemplary device 700 may comprise a display 750. As discussed elsewhere herein, the user may utilize a display to view and/or interact with maps and/or images of network environments (e.g., for device location input and/or definition, for device selection, etc.). Such interaction may, for example, utilize a display 750 of the device 700, which may also, for example, be utilized for user input (e.g., as a touch screen, utilizing cursor control, etc.).

The exemplary device 700 may comprise one or more processors 760. The processor(s) 760 may, for example, comprise a general purpose processor, digital signal processor, application-specific processor, microcontroller, microprocessor, etc. The processor(s) 760 may, for example, share any or all characteristics with processors discussed elsewhere herein (e.g., processors 360, 460, 560 and 660). For example, the processor 760 may operate in accordance with software (or firmware) instructions. As mentioned previously, any or all functionality discussed herein may be performed by a processor executing instructions. For example, though various modules are illustrated as separate blocks or modules in FIG. 7 for illustrative clarity, such illustrative modules, or a portion thereof, may be implemented by the processor(s) 760. For example, the processor(s) 760 may operate to perform any or all of the steps discussed previously with regard to FIGS. 1 and 2.

The exemplary device 700 may comprise one or more memories 761. As discussed above, various aspects may be performed by one or more processors executing instructions. Such instructions may, for example, be stored in the one or more memories 761. Such memory 761 may, for example, comprise characteristics of any of a variety of types of memory. For example and without limitation, such memory 761 may comprise one or more memory chips (e.g., ROM, RAM, EPROM, EEPROM, flash memory, one-time-programmable OTP memory, etc.), hard drive memory, CD memory, DVD memory, etc. Also for example, the memory 761 may share any or all characteristics with any of the databases discusses herein (e.g., databases 361, 461, 561 and 661).

The exemplary device 700 may also comprise one or more device ID determination modules 771. Such module(s) 771 may, for example and without limitation, operate to (including, for example, operate when enabled to) perform any or all of the functionality discussed herein with regard to receiving device identity information (e.g., at steps 110 and 210).

The exemplary device 700 may also comprise one or more device location determination modules 772. Such module(s) 772 may, for example and without limitation, operate to (including, for example, operate when enabled to) perform any or all of the functionality discussed herein with regard to receiving device identity information (e.g., at steps 120 and 220).

The exemplary device 700 may also comprise one or more additional device information determination modules 774. Such module(s) 774 may, for example and without limitation, operate to (including, for example, operate when enabled to) perform any or all of the functionality discussed herein with regard to receiving additional device information (e.g., at steps 130 and 230).

The exemplary device 700 may also comprise one or more database formation modules 778. Such module(s) 778 may, for example and without limitation, operate to (including, for example, operate when enabled to) perform any or all of the functionality discussed herein with regard to forming and/or maintaining the communication network and/or network descriptions discussed herein (e.g., at steps 140 and 240).

The exemplary device 700 may also comprise one or more database interface modules 790. Such module(s) 790 may, for example and without limitation, operate to perform any or all of the database interface functionality discussed herein.

Figure 8:
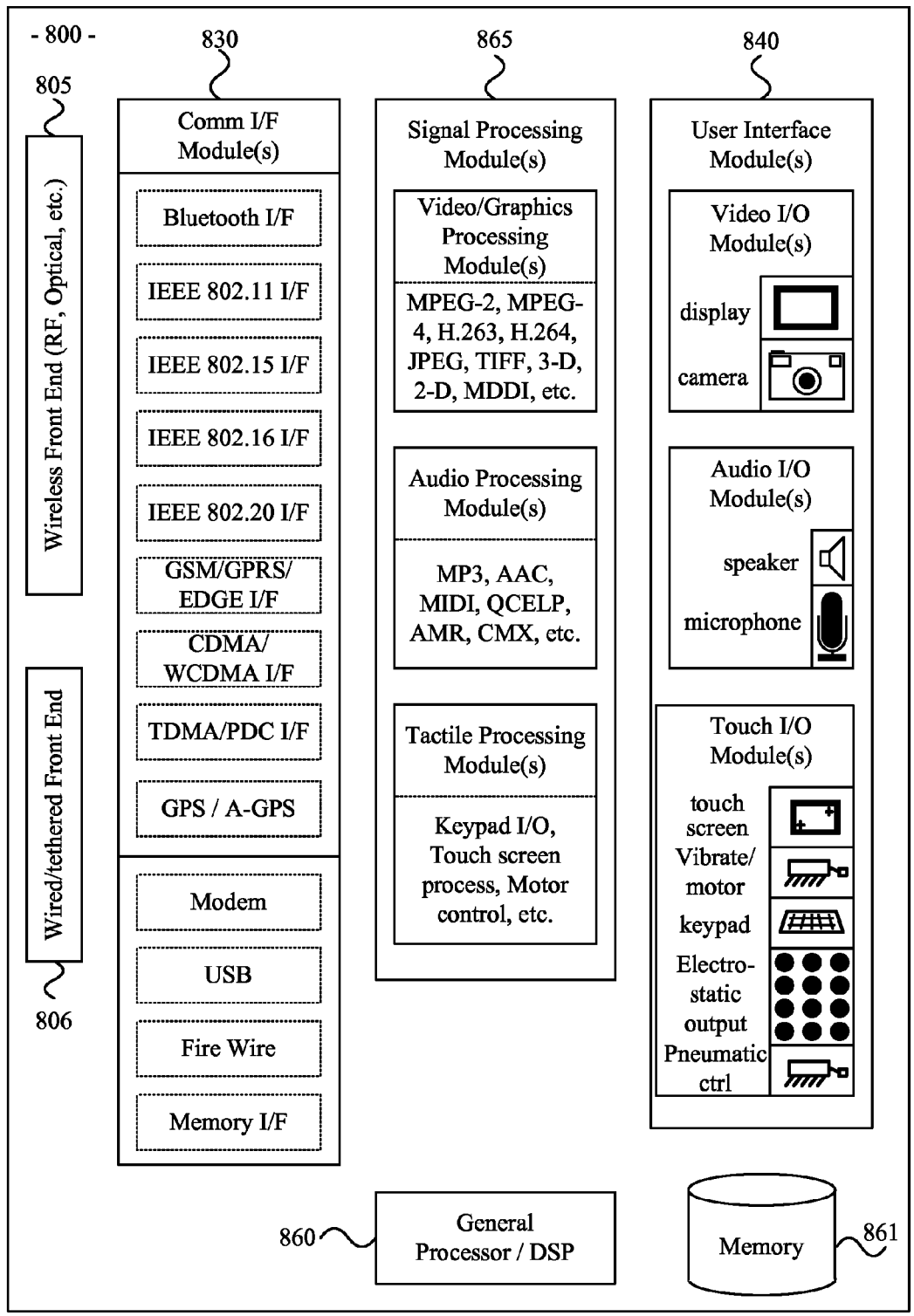
FIG. 8 shows a block diagram of a non-limiting exemplary device for automatically maintaining a network of user-selectable devices and/or a database characterization thereof, in accordance with various aspects of the present invention.

FIG. 8 shows a block diagram of a non-limiting exemplary device 800 for automatically maintaining a network of user-selectable devices and/or a database characterization thereof, in accordance with various aspects of the present invention. FIG. 7 provided a diagram illustrating an exemplary device (or system) 700 in accordance with various aspects of the present invention. FIG. 8 provides another diagram illustrating an exemplary device (or system) 800 in accordance with various aspects of the present invention.

The exemplary device 800 may share any or all aspects with any of the devices (e.g., portable computer devices, access points, gateways, network controllers, terminal devices, etc.) discussed herein (e.g., with regard to FIGS. 1-7). For example, the exemplary device 800 (or various modules thereof) may operate to perform any or all functionality discussed herein. As with the exemplary device 700, the components of the exemplary device 800 may be co-located a single housing.

For example, the device 800 comprises a processor 860. Such a processor 860 may, for example, share any or all characteristics with the processor 760 discussed with regard to FIG. 7. Also for example, the device 800 comprises a memory 861. Such memory 861 may, for example, share any or all characteristics with the memory 761 discussed with regard to FIG. 7.

Also for example, the exemplary device (or system) 800 may comprise any of a variety of user interface module(s) 840. Such user interface module(s) 840 may, for example, share any or all characteristics with the user interface module(s) 740 discussed previously with regard to FIG. 7. For example and without limitation, the user interface module(s) 840 may comprise: a display device, a camera (for still or moving picture acquisition), a speaker, an earphone (e.g., wired or wireless), a microphone, a video screen (e.g., a touch screen display), a vibrating mechanism, a keypad, a remote control interface, and/or any of a variety of other user interface devices (e.g., a mouse, a trackball, a touch pad, touch screen, light pen, game controlling device, etc.).

The exemplary device 800 may also, for example, comprise any of a variety of communication modules (805, 806, and 830). Such communication module(s) may, for example, share any or all characteristics with the communication interface module(s) 710, 720 and the communication module 730 discussed previously with regard to FIG. 7. For example and without limitation, the communication interface module(s) 830 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, component and/or composite video, Ethernet, wire line and/or cable modem, etc.); any of a variety of communication interface modules related to communicating with external memory devices; etc. The exemplary device 800 is also illustrated as comprising various wired 806 and/or wireless 805 front-end modules that may, for example, be included in the communication interface modules and/or utilized thereby.

The exemplary device (or system) 800 may also comprise any of a variety of signal processing module(s) 865. Such signal processing module(s) 865 may, for example, be utilized to assist in processing various types of information discussed previously (e.g., with regard to sensor processing, position or location determination, orientation determination, video processing, image processing, audio processing, general user interface information data processing, etc.). For example and without limitation, the signal processing module(s) 890 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., Keypad I/O, touch screen processing, motor control, etc.).

The previous discussion generally concerned a system and method for maintaining a network of user-selectable device (e.g., for remote monitoring and/or control).

In summary, various aspects of the present invention provide a system and method for automatically forming and/or maintaining a network of user-selectable devices. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for managing a network of user-selectable devices, the method comprising:
at a network controller device configured for data communication with remotely located user-selectable devices of the network of user-selectable devices, automatically without user interaction during execution of the method:
analyzing an image to detect a change in the network, the detected change associated with a device;
upon detection of a change associated with the device, initiating a communication link with the device;
receiving from the device over the communication link device identity information for the device;
receiving device location information for the device; and
maintaining a database describing the network of user-selectable devices, the database comprising the received device identity information and the received device location information for each respective device of the network of user-selectable devices which are selectable by a user accessing the database for monitoring and controlling respective devices of the network of user-selectable devices.

2. The method of claim 1, wherein said detecting a change comprises detecting devices within an area.

3. The method of claim 1, wherein said detecting a change comprises detecting that the device is a new device in a geographical area and wherein initiating a communication link with the device comprises transmitting one or more beacon messages corresponding to one or more communication protocols.

4. The method of claim 1, wherein said detecting a change comprises detecting that the device has moved within a geographical area and wherein initiating a communication link with the device comprises transmitting to the geographical area one or more beacon messages corresponding to one or more communication protocols to initiate radio communication with the device.

5. The method of claim 1, wherein said detecting a change comprises detecting that the device is no longer active within a geographical area.

6. The method of claim 1, wherein said detecting a change comprises monitoring for RF transmissions indicative of a change in the network and wherein initiating a communication link with the device comprises transmitting one or more beacon messages corresponding to one or more communication protocols.

7. The method of claim 1, wherein said receiving device identity information comprises receiving information from the device describing radio frequency emissions from the device that may be utilized to identify device.

8. The method of claim 1, wherein the device identity information comprises image information.

9. The method of claim 1, wherein the device identity information comprises information indicating a type of the device.

10. The method of claim 1, wherein said receiving device location information comprises receiving the device location information from the device.

11. The method of claim 1, wherein said receiving device location information comprises receiving the device location information from a location-determining system different from the device.

12. The method of claim 1, comprising receiving user interface information from the device over the communication link.

13. The method of claim 1, comprising receiving communication information describing how to communicate with the user-selectable device.

14. The method of claim 1, wherein said maintaining a database comprises maintaining a data structure in which information of a user-selectable device is retrievable by device location, the method further comprising providing a database interface by which another process may access information maintained in the database including the received device identity information and the received device location information for monitoring and controlling the respective devices of the network of user-selectable devices.

15. A system for managing a network of user-selectable devices, the system comprising:
at least one module at a network controller device configured for data communication with the user-selectable devices of the network of user selectable devices, the at least one module operable to, at least:
automatically, without direct user interaction:
detect a change in the network by monitoring the network of user-selectable devices to determine whether a device environment corresponding to a monitored area has changed, the detected change associated with a device;
upon detecting a change in the network associated with the device, initiate communication with the device;
receive from the device over the communication link device identity information for the device;
receive device location information for the device; and
maintain a database in data communication with the network controller device, the database storing data describing the network of user-selectable devices, the data stored in the database comprising the received device identity information and the received device location information for each respective device of the network of user-selectable devices which are selectable by a user accessing the database for monitoring and controlling respective devices of the network of user-selectable devices.

16. The system of claim 15, wherein said at least one module is operable to detect a change in the network by, at least in part, operating to detect devices within an area.

17. The system of claim 15, wherein said at least one module is operable to detect a change in the network by, at least in part, operating to detect that the device is a new device in a geographical area.

18. The system of claim 15, wherein said at least one module is operable to detect a change in the network by, at least in part, operating to detect that the device has moved within a geographical area.

19. The system of claim 15, wherein said at least one module is operable to detect a change in the network by, at least in part, operating to detect that the device is no longer active within a geographical area.

20. The system of claim 15, wherein said at least one module is operable to detect a change in the network by, at least in part, operating to monitor for RF transmissions indicative of a change in the network.

21. The system of claim 15, wherein said at least one module is operable to detect a change in the network by, at least in part, operating to analyze an image to detect a change in the network.

22. The system of claim 15, wherein said at least one module is operable to receive device identity information by, at least in part, operating to receive radio frequency emissions suitable to identify the device.

23. The system of claim 15, wherein the device identity information comprises image information.

24. The system of claim 15, wherein the device identity information comprises information indicating a type of the device.

25. The system of claim 15, wherein said at least one module is operable to receive device location information by, at least in part, operating to receive the device location information from the device.

26. The system of claim 15, wherein said at least one module is operable to receive device location information by, at least in part, operating to receive the device location information from a location-determining system different from the device.

27. The system of claim 15, wherein said at least one module is operable to receive user interface information from the device.

28. The system of claim 15, wherein said at least one module is operable to receive communication information describing how to communicate with the user-selectable device.

29. The system of claim 15, wherein said at least one module is operable to maintain the database describing the network of user-selectable devices by, at least in part, operating to maintain a data structure in which information of a user-selectable device is retrievable by device location and wherein said at least one module is further operable to provide a database interface by which another process may access information maintained in the database including the received device identity information and the received device location information for monitoring and controlling the respective devices of the network of user-selectable devices.

* * * * *

UNITED STATES PATENT AND TRADEMARK OFFICE
CERTIFICATE OF CORRECTION

| | | |
|---|---|---|
| PATENT NO. | : 8,812,656 B2 | Page 1 of 1 |
| APPLICATION NO. | : 13/042165 | |
| DATED | : August 19, 2014 | |
| INVENTOR(S) | : Jeyhan Karaoguz | |

It is certified that error appears in the above-identified patent and that said Letters Patent is hereby corrected as shown below:

<u>On the Title Page</u>

Left column, item (75), after "Jeyhan" replace "Karaogoz" with --Karaoguz--.

Signed and Sealed this
Second Day of December, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,812,656 B2
APPLICATION NO. : 13/042165
DATED : August 19, 2014
INVENTOR(S) : Jeyhan Karaoguz It is certified that error appears in the above-identified patent and that said Letters Patent is hereby corrected as shown below:

On the Title Page

Item (12), delete "Karaogoz" and insert --Karaoguz--.
    Left column, item (75), after "Jeyhan" replace "Karaogoz" with --Karaoguz--.

This certificate supersedes the Certificate of Correction issued December 2, 2014.

Signed and Sealed this
Twenty-third Day of December, 2014

Michelle K. Lee
*Deputy Director of the United States Patent and Trademark Office*